(12) United States Patent
Takeda et al.

(10) Patent No.: US 10,993,129 B2
(45) Date of Patent: Apr. 27, 2021

(54) TERMINAL, RADIO COMMUNICATION METHOD, AND BASE STATION

(71) Applicant: NTT DOCOMO, INC., Tokyo (JP)

(72) Inventors: Kazuaki Takeda, Tokyo (JP); Shimpei Yasukawa, Tokyo (JP); Satoshi Nagata, Tokyo (JP); Hideyuki Moroga, Tokyo (JP); Liu Liu, Beijing (CN); Qin Mu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 68 days.

(21) Appl. No.: 15/543,840

(22) PCT Filed: Jan. 21, 2016

(86) PCT No.: PCT/JP2016/051697
§ 371 (c)(1),
(2) Date: Jul. 14, 2017

(87) PCT Pub. No.: WO2016/117643
PCT Pub. Date: Jul. 28, 2016

(65) Prior Publication Data
US 2018/0014219 A1    Jan. 11, 2018

(30) Foreign Application Priority Data

Jan. 23, 2015  (JP) .............................. JP2015-011047

(51) Int. Cl.
*H04W 24/10* (2009.01)
*H04W 72/08* (2009.01)
(Continued)

(52) U.S. Cl.
CPC ......... *H04W 24/10* (2013.01); *H04W 72/042* (2013.01); *H04W 72/0446* (2013.01);
(Continued)

(58) Field of Classification Search
CPC ..... H04W 24/10; H04W 72/08; H04W 72/14; H04W 72/042; H04W 72/0446
See application file for complete search history.

(56) References Cited

U.S. PATENT DOCUMENTS

2007/0026808 A1* 2/2007 Love .................... H04L 1/0026
455/67.7
2010/0315962 A1   12/2010 Imai et al.
(Continued)

FOREIGN PATENT DOCUMENTS

CN   103999528 A   8/2014
JP   2012-222430 A  11/2012
(Continued)

OTHER PUBLICATIONS

International Search Report issued in PCT/JP2016/051697 dated Mar. 29, 2016 (2 pages).
(Continued)

*Primary Examiner* — Jamal Javaid
(74) *Attorney, Agent, or Firm* — Osha Bergman Watanabe & Burton LLP

(57) ABSTRACT

The present invention is designed to measure and/or report CSI (Channel State Information) of a plurality of narrow bands, even when the band to use is limited to a partial narrow band in a system band. According to one aspect of the present invention, a user terminal, in which the band to use is limited to a partial narrow band in a system band, has a receiving section that receives information related to CSI (Channel State Information) measurement in a narrow band, a measurement section that measures CSIs in a plurality of narrow bands based on the information related to CSI measurement, and a transmission section that reports the measured CSIs.

7 Claims, 13 Drawing Sheets

(51) Int. Cl.
*H04W 72/04* (2009.01)
*H04W 72/14* (2009.01)
*H04W 88/02* (2009.01)

(52) U.S. Cl.
CPC ........... *H04W 72/08* (2013.01); *H04W 72/14* (2013.01); *H04W 88/02* (2013.01)

(56) References Cited

U.S. PATENT DOCUMENTS

| | | | | |
|---|---|---|---|---|
| 2011/0235743 | A1* | 9/2011 | Lee | H04L 5/0082 |
| | | | | 375/295 |
| 2011/0299484 | A1* | 12/2011 | Nam | H04L 5/0057 |
| | | | | 370/329 |
| 2013/0083753 | A1 | 4/2013 | Lee et al. | |
| 2013/0223258 | A1* | 8/2013 | Seo | H04W 24/02 |
| | | | | 370/252 |
| 2014/0029458 | A1* | 1/2014 | Ye | H04L 5/0053 |
| | | | | 370/252 |
| 2014/0044109 | A1 | 2/2014 | Nogami et al. | |
| 2014/0126476 | A1 | 5/2014 | Kang et al. | |
| 2015/0009922 | A1* | 1/2015 | Hoshino | H04L 5/0053 |
| | | | | 370/329 |

FOREIGN PATENT DOCUMENTS

| | | |
|---|---|---|
| WO | 2008/081857 A1 | 7/2008 |
| WO | 2013/121728 A1 | 8/2013 |

OTHER PUBLICATIONS

Written Opinion of the International Searching Authority issued in PCT/JP2016/051697 dated Mar. 29, 2016 (4 pages).
3GPP TSG RAN WG1 Meeting #79; R1-144576; Huawei, HiSilicon; "DL TM and CQI reporting reduction for LC UEs"; San Francisco, USA; Nov. 17-21, 2014 (5 pages).
3GPP TSG RAN WG1 Meeting #79; R1-144897; LG Electronics; "Considerations on CSI reporting for low complexity UE"; San Francisco, USA; Nov. 17-21, 2014 (3 pages).
3GPP TSG RAN WG1 Meeting #76; R1-140110; Intel Corporation; "Discussion on Remaining Details of CSI Feedback for eIMTA Support"; Prague, Czech Republic; Feb. 10-14, 2014 (7 pages).
3GPP TSG-RAN WG1 Meeting #76; R1-140153; Alcatel-Lucent, Alcatel-Lucent Shanghai Bell; "Coverage enhancement for RACH messages"; Prague, Czech Republic; Feb. 10-14, 2014 (5 pages).
3GPP TSG RAN WG1 Meeting #74bis; R1-134903; Zte et al.; "Way Forward on Interference Measurement for eIMTA"; Guangzhou, China; Oct. 7-11, 2013 (2 pages).
3GPP TS 36.300 V8.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).
3GPP TR 36.888 V12.0.0; "3rd Generation Partnership Project; Technical Specification Group Radio Access Network; Study on provision of low-cost Machine-Type Communications (MTC) User Equipments (UEs) based on LTE (Release 12)"; Mar. 2013 (55 pages).
Notice of Reasons for Refusal issued in Japanese Application No. 2016-570699, dated Aug. 27, 2019 (8 pages).
Notice of Reasons for Refusal issued in Japanese Application No. 2016-570699, dated Nov. 26, 2019 (6 pages).
Notice of Reasons for Refusal issued in Japanese Application No. 2016-570699, dated Feb. 18, 2020 (7 pages).
3GPP TSG RAN WG1 Meeting #62; R1-104983; "Aperiodic CSI transmission on PUSCH for CA;" ETRI; Aug. 23-27, 2010; Madrid, Spain (5 pages).
Office Action issued in the counterpart Chinese Patent Application No. 201680006661.2, dated Sep. 3, 2020 (12 pages).

* cited by examiner

FIG. 4A

| Value of CSI measurement request field | Description |
|---|---|
| 00 | No aperiodic CSI measurement and reporting is triggered |
| 01 | Aperiodic CSI measurement and reporting is triggered for a $1^{st}$ set of reduced UE BW sets configured by higher layers |
| 10 | Aperiodic CSI measurement and reporting is triggered for a $2^{nd}$ set of reduced UE BW sets configured by higher layers |
| 11 | Aperiodic CSI measurement and reporting is triggered for a $3^{rd}$ set of reduced UE BW sets configured by higher layers |

FIG. 4B

| Value of CSI measurement request field | Description |
|---|---|
| 00 | No aperiodic CSI measurement is triggered |
| 01 | Aperiodic CSI measurement is triggered for a $1^{st}$ set of reduced UE BW sets configured by higher layers |
| 10 | Aperiodic CSI measurement is triggered for a $2^{nd}$ set of reduced UE BW sets configured by higher layers |
| 11 | Aperiodic CSI measurement is triggered for a $3^{rd}$ set of reduced UE BW sets configured by higher layers |

| Value of CSI request field | Description |
|---|---|
| 00 | No aperiodic CSI reporting is triggered |
| 01 | Aperiodic CSI reporting is triggered for a 1st set of reduced UE BW sets configured by higher layers |
| 10 | Aperiodic CSI reporting is triggered for a 2nd set of reduced UE BW sets configured by higher layers |
| 11 | Aperiodic CSI reporting is triggered for a 3rd set of reduced UE BW sets configured by higher layers |

FIG. 8

TERMINAL, RADIO COMMUNICATION METHOD, AND BASE STATION

TECHNICAL FIELD

The present invention relates to a user terminal, a radio base station and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). Also, successor systems of LTE (also referred to as, for example, "LTE-advanced" (hereinafter referred to as "LTE-A"), "FRA" (Future Radio Access) and so on) are under study for the purpose of achieving further broadbandization and increased speed beyond LTE.

Now, accompanying the cost reduction of communication devices in recent years, active development is in progress in the field of technology related to machine-to-machine communication (M2M) to implement automatic control of network-connected devices and allow these devices to communicate with each other without involving people. In particular, of all M2M, 3GPP (3rd Generation Partnership Project) is promoting standardization with respect to the optimization of MTC (Machine-Type Communication), as a cellular system for machine-to-machine communication (see non-patent literature 2). MTC terminals are being studied for use in a wide range of fields, such as, for example, electric meters, gas meters, vending machines, vehicles and other industrial equipment.

CITATION LIST

Non-Patent Literature

Non-Patent Literature 1: 3GPP TS 36. 300 "Evolved Universal Terrestrial Radio Access (E-UTRA) and Evolved Universal Terrestrial Radio Access Network (E-UTRAN); Overall Description; Stage 2"

Non-Patent Literature 2: 3GPP TS 36.888 "Study on provision of low-cost Machine-Type Communications (MTC) User Equipments (UEs) based on LTE (Release 12)"

SUMMARY OF INVENTION

Technical Problem

From the perspective of reducing the cost and improving the coverage area in cellular systems, amongst all MTC terminals, low-cost MTC terminals (low-cost MTC UEs) that can be implemented in simple hardware structures have been increasingly in demand. Low-cost MTC terminals can be implemented by limiting the band to use in the uplink (UL) and the downlink (DL) to a portion (one component carrier, for example) of a system band.

However, when a plurality of candidate narrow bands (for example, 1.4 MHz) for bands to use are configured in a system band, measurements and reporting of channel state information (CSI: Channel State Information) need to be made for each of these plurality of narrow bands. However, in each subframe, only one narrow band's CSI can be measured, and therefore there is a need to establish an efficient CSI measurement and reporting method.

The present invention has been made in view of the above, and it is therefore an object of the present invention to provide a user terminal, a radio base station and a radio communication method that can measure and/or report CSI adequately in a plurality of narrow bands even when the band to use is limited to partial narrow bands in a system band.

Solution to Problem

One aspect of the present invention provides a user terminal, in which the band to use is limited to a partial narrow band in a system band, and this user terminal has a receiving section that receives information related to CSI (Channel State Information) measurement in a narrow band, a measurement section that measures CSIs in a plurality of narrow bands based on the information related to CSI measurement, and a transmission section that reports the measured CSIs.

Advantageous Effects of Invention

According to the present invention, it is possible to measure and/or report CSIs adequately in a plurality of narrow bands even when the band to use is limited to partial narrow bands in a system band.

BRIEF DESCRIPTION OF DRAWINGS

FIG. 4 provide diagrams to show examples of information related to CSI measurement requests according to a third embodiment;

FIG. 8 is a diagram to show examples of information related to CSI measurement requests according to the third embodiment;

DESCRIPTION OF EMBODIMENTS

Figures 1A, 1B:
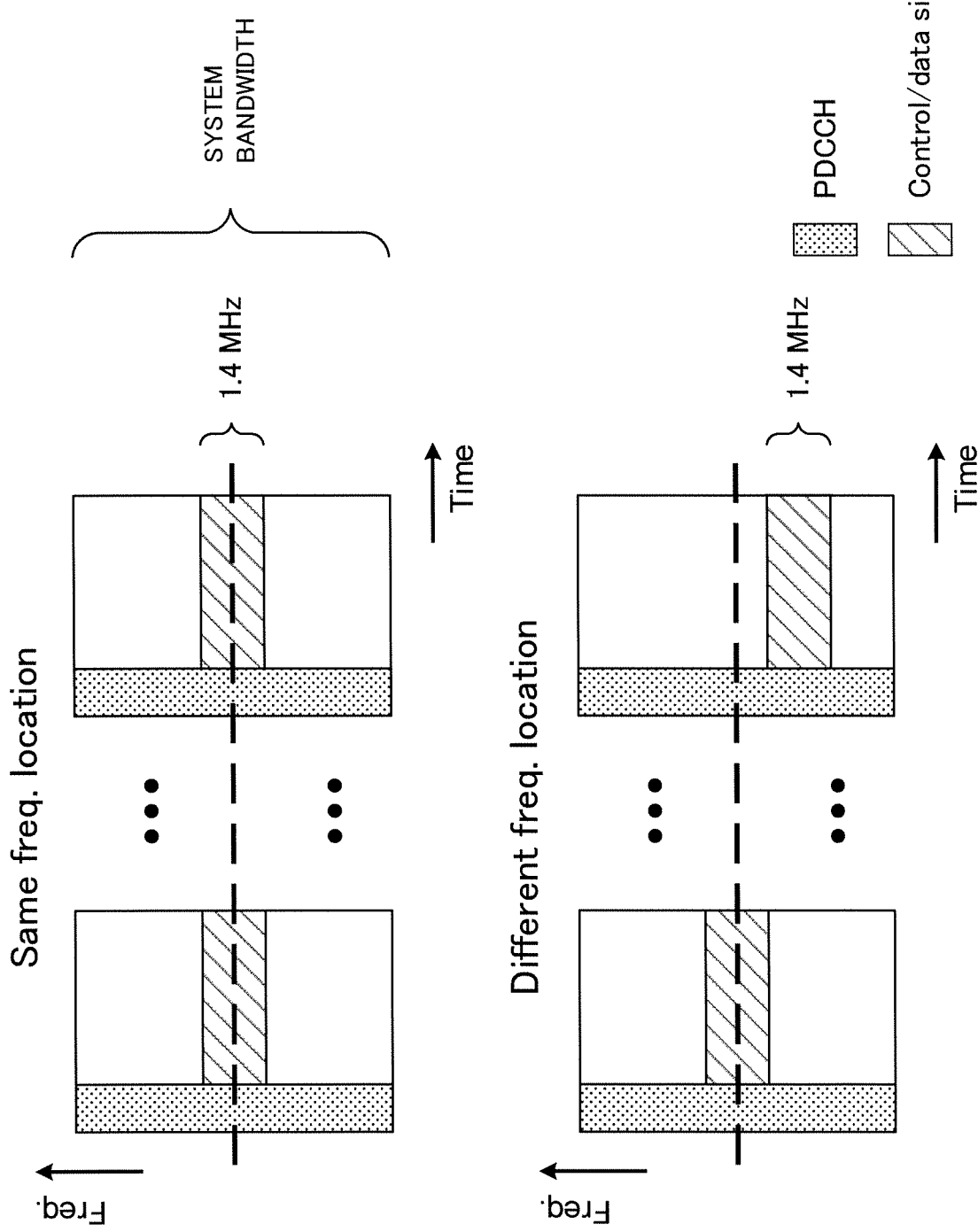
FIG. 1 provide diagrams, each showing an example of the arrangement of narrow bands in a downlink system band.

A study in progress to limit the processing capabilities of terminals by making the peak rate low, limiting the resource blocks, allowing limited RF reception and so on, in order to reduce the cost of MTC terminals. For example, the maximum transport block size in unicast transmission using a downlink data channel (PDSCH: Physical Downlink Shared Channel) is limited to 1000 bits, and the maximum transport block size in BCCH transmission using a downlink data channel is limited to 2216 bits. Furthermore, the downlink data channel bandwidth is limited to 6 resource blocks (also referred to as "RBs" (Resource Blocks), "PRBs" (Physical Resource Blocks), etc.). Furthermore, the RFs to receive in MTC terminals are limited to one.

Furthermore, the transport block size and the resource blocks in low-cost MTC terminals (LC (Low Cost) MTC UEs) are more limited than in existing user terminals, and therefore low-cost MTC terminals cannot connect with cells in compliance with LTE Rel-8 to Rel-11. Consequently, low-cost MTC terminals connect only with cells where a permission of access is reported to the low-cost terminals in broadcast signals. Furthermore, a study is in progress to limit not only downlink data signals, but also various control signals that are transmitted on the downlink (such as system information, downlink control information and so on), data signals and various control signals that are transmitted on the uplink and so on, to predetermined narrow bands (for example, 1.4 MHz).

Such band-limited MTC terminals need to be operated on the LTE system band, considering the relationship with existing user terminals. For example, in a system band, frequency-multiplexing of band-limited MTC terminals and band-unlimited existing user terminals is supported. Furthermore, the band-limited user terminals can only support predetermined narrow-band RFs in the uplink and the downlink. Here, the MTC terminals are terminals that support only partial narrow bands in a system band as the maximum band they can support, and the existing user terminals are terminals that support a system band (for example, 20 MHz) as the maximum band they can support.

That is, the upper limit of the band for use by MTC terminals is limited to narrow bands, and, for existing user terminals, the system band is configured as the upper limit of the band to use. MTC terminals are designed presuming narrow bands, and therefore the hardware structure is simplified, and their processing capabilities are low compared to existing user terminals. Note that MTC terminal may be referred to as "low-cost MTC terminals" (LC-MTC UEs), "MTC UEs" and so on. Existing user terminals may be referred to as "normal UEs," "non-MTC UEs," category 1 UEs" and so on.

Now, the arrangement of narrow bands in a downlink system band will be described with reference to FIG. 1. As shown in FIG. 1A, the band for use for MTC terminals is limited to a partial narrow band (for example, 1.4 MHz) in an existing LTE band (for example, 20 MHz). When a narrow band is fixed in a predetermined frequency location in a system band, the traffic concentrates in the central frequency. Furthermore, since no frequency diversity effect can be achieved, the spectral efficiency might decrease.

On the other hand, as shown in FIG. 1B, when a configuration is employed in which the location of a narrow band to serve as a band to use can be changed within a system band, it is possible to implement traffic offloading for MTC terminals and achieve a frequency diversity effect, so that it is possible to reduce the decrease of spectral efficiency. Consequently, considering the application to frequency hopping, frequency scheduling and so on, MTC terminals should preferably have an RF retuning function.

Now, since MTC terminals only support 1.4-MHz narrow bands, it is not possible to detect downlink control information (DCI) that is transmitted in a wideband PDCCH. So, it may be possible to allocate downlink (PDSCH) and uplink (PUSCH: Physical Uplink Shared Channel) resources to MTC terminals by using an EPDCCH (Enhanced Physical Downlink Control Channel).

Figure 2:
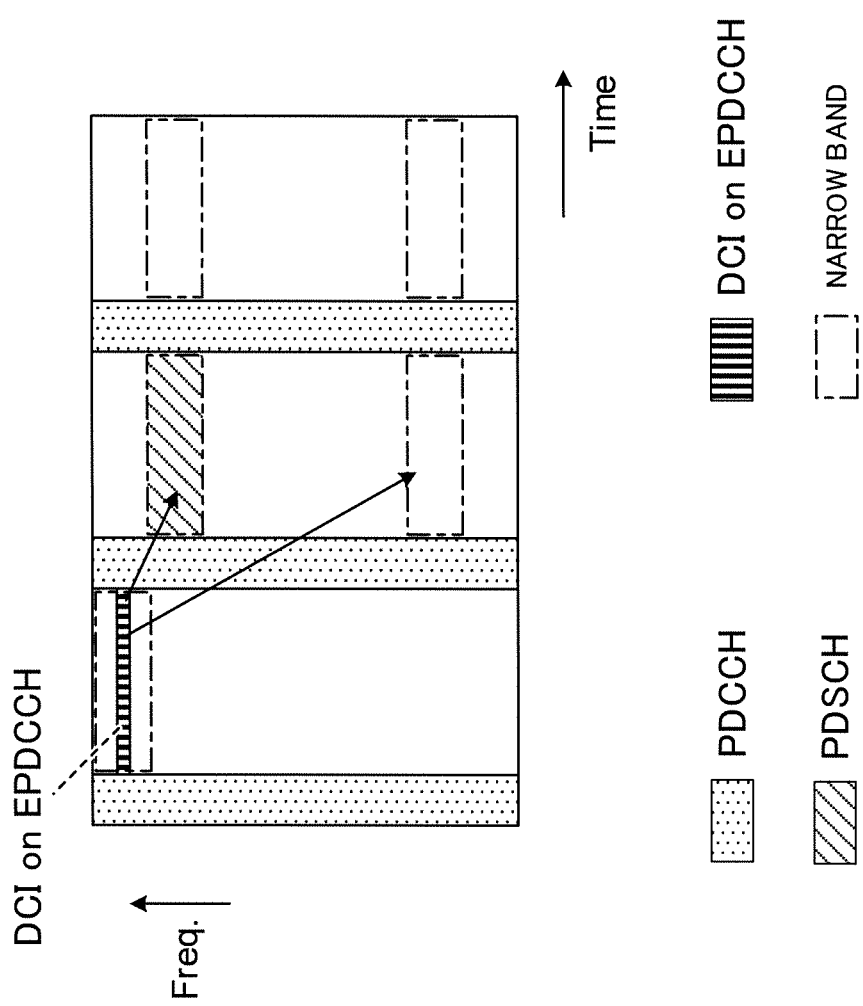
FIG. 2 is a diagram to show an example of PDSCH allocation in MTC terminals.

FIG. 2 is a diagram to show an example of PDSCH allocation in MTC terminals. As shown in FIG. 2, first, an EPDCCH is allocated to a predetermined narrow band. Information about the frequency location where the EPDCCH is allocated may be reported by higher layer signaling (for example, RRC signaling, broadcast signals, etc.) or may be configured in user terminals in advance.

The EPDCCH includes DCI that relates to the resources to allocate a PDSCH. Candidate radio resources where a PDSCH can be allocated (PDSCH sets) are reported to the user terminals via higher layer signaling, and one of the PDSCH sets is dynamically selected based on the DCI. For example, in FIG. 2, in the next subframe after the EPDCCH is transmitted, the user terminal learns which PDSCH set the user terminal should receive, based on the DCI, and receives the PDSCH. Note that, the PDSCH may be received in the same subframe the EPDCCH is received.

The user terminal receives the PDSCH in the allocated resources specified by the EPDCCH. For example, the user terminal can specify the PRBs that are included in the PDSCH to be received, based on a resource allocation (RA) field in DCI. Here, the RA field size can be reduced, and, in this case, the frequency scheduling gain can still be maintained.

Now, in order to use frequency scheduling, it is necessary to measure and report channel state information (CSI) for frequency blocks comprised of a plurality of narrow bands (for example, 1.4 MHz). However, only one narrow band's CSI can be measured in each subframe, and therefore there is a need to establish CSI measurement method for a wide band over 1.4 MHz (or a plurality of 1.4-MHz frequency blocks).

Also, making LC-MTC terminals measure CSI periodically has the problem of triggering an increase of power consumption in user terminals. Furthermore, making LC-MTC terminals with infrequent traffic report CSI periodically by using the PUCCH (Physical Uplink Control Channel) has the problem of making uplink communication less efficient and triggering an increase of power consumption in user terminals.

So, the present inventors have come up with the idea of controlling the timing to make a CSI measurement in each narrow band based on information related to narrow band CSI measurements, and thereupon arrived at the present invention.

According to one aspect of the present invention, the receipt of a downlink control signal transmitted in a PDCCH/EPDCCH triggers the start of a CSI measurement. By this means, a user terminal does not have to make periodic CSI measurements (and frequency retuning) for a long period of time and can measure and report CSI efficiently, thereby making the application of frequency scheduling easy.

The information related to narrow band CSI measurements according to the present invention may be information about narrow band CSI subframe sets (first embodiment), information about the start or stop of periodic CSI measurements in narrow bands (second embodiment), and narrow band CSI measurement requests (third embodiment), which will be described below. Although MTC terminals will be shown as an example of user terminals in which the band to use is limited to narrow bands, the application of the present invention is not limited to MTC terminals. Furthermore, although 6-PRB (1.4-MHz) narrow bands will be described below, the present invention can be applied to other narrow bands as well, based on the present description.

First Embodiment

According to the first embodiment of the present invention, a subframe set (CSI measurement subframe set), which represents a group of subframes for measuring CSI in a narrow band, is configured in a user terminal. The user terminal measures CSIs in the subframes (CSI subframes) belonging to a subframe set that is received. Here, the CSI measurement subframes should preferably be configured to vary in each narrow band. Note that a CSI measurement subframe set may also be referred to as a "CSI subframe set."

Information about narrow band CSI subframe sets is reported from a radio base station to user terminals via higher layer signaling (for example, RRC signaling, MAC signaling, broadcast signals, etc.). However, if CSI subframe sets are configured in the user terminal and the radio base station in common, the above reporting is not necessary.

The information about narrow band CSI subframe sets may include, for example, information about the frequencies where CSI subframes are configured (for example, information to specify narrow bands), and information about the timings of CSI subframes (for example, the cycle of CSI subframes, subframe offsets, subframe numbers, subframe locations, and so on). The information about the timings of CSI subframes may be, for example, a bit map in which '1' represents CSI subframes and '0' represents subframes that are not CSI subframes. This bitmap may be, for example, 20, 40, 60 or 80 bits long, but these are by no means limiting.

Note that the information about narrow band CSI subframe sets may be reported by using, for example, a control signal (for example, DCI(Downlink Control Information)). The information about narrow band CSI subframe sets may be made values that are to be associated with information that is reported separately by higher layer signaling an so on. Also, information about the CSI subframe sets of a plurality of narrow bands may be included in one signaling and reported.

Figure 3:
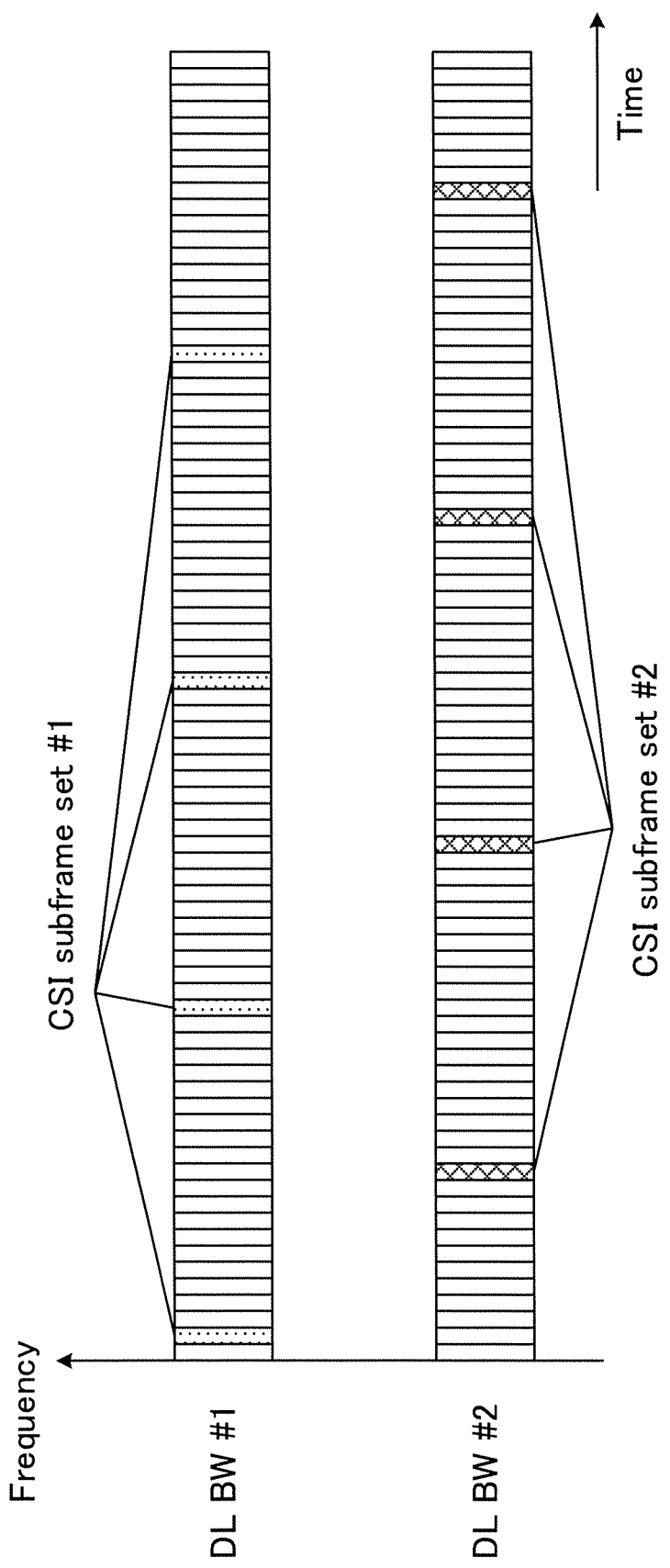
FIG. 3 is a diagram to show examples of CSI measurements according to a first embodiment.

FIG. 3 is a diagram to show examples of CSI measurements according to the first embodiment. FIG. 3 shows two downlink bands (DL BW #1 and DL BW #2), which are narrow bands configured in a user terminal. Also, CSI subframe set #1 and CSI subframe set #2, each a CSI subframe set corresponding to a separate narrow band, are configured. Different subframe offsets are applied to the CSI subframes in FIG. 3 so as to avoid making narrow band measurements at the same timing. Also, although the cycle of CSI subframes is made the same cycle (20 subframes) in each narrow band in FIG. 3, this is by no means limiting, and, for example, it is possible to use make a multiple of the CSI subframe cycle in one narrow band the CSI subframe cycle in the other narrow band.

CSI measurements based on CSI subframes are applicable to both transmission modes in which CSI is measured based on CRSs (Cell-specific Reference Signals) (for example, transmission mode 4), and transmission modes in which CSI is measured based on DM-RSs (Demodulation Reference Signals) (for example, transmission mode 7 to 9).

As described above, the first embodiment is designed to configure CSI subframe sets adequately, so that it is possible to remove unnecessary CSI measurements in user terminals, and reduce the increase of power consumption.

Note that, according to the first embodiment, a user terminal should preferably report measured CSI, based on a UL grant, by using a PUSCH in an uplink narrow band. By this means, compared to when the user terminal reports CSI periodically by using a PUCCH, it is possible to avoid making uplink communication less efficient and reduce the increase of power consumption in the user terminal. Note that the UL grant here may be structured to include a CSI request that pertains to a predetermined narrow band. This structure will be described later.

Also, another problem that should be taken into consideration with the first embodiment will be described. A normal user terminal that is capable of communicating simultaneously in a wide band (in a plurality of narrow bands) can transmit and/or receive data in one narrow band at timings that meet CSI subframes in other narrow bands. However, a user terminal (for example, an MTC terminal) that is capable of communicating only in one narrow band is not capable of simultaneous communication like this, and therefore it is necessary to define the way the user terminal should operate when the user terminal transmits and/or receives data in one narrow band at a timing that meets a CSI subframe in another narrow band.

The user terminal may be structured so that, when commanded to transmit or receive data at the same timing as a CSI subframe, the user terminal skips (does not make) the CSI measurement in this CSI subframe, and transmits or receives data as commanded. For example, when a PDSCH is triggered at the same timing as a CSI subframe in a given narrow band, the user terminal may prioritize the receipt of the PDSCH in this subframe. Also, the user terminal may be structured so that, when commanded to transmit or receive data in a CSI subframe, the user terminal measures CSI in this subframe.

Also, a radio base station may be structured so that, when the radio base station judges that a subframe in which the radio base station wants a user terminal to transmit or receive data matches a CSI subframe configured in this user terminal, the radio base station does not schedule transmission or receipt of data in this CSI subframe. Also, assuming the case where the user terminal is scheduled to receive data (PDSCH) in CSI subframes, when a CSI subframe timing in a predetermined narrow band arrives, the radio base station can suspend PDSCH transmission in the other narrow bands. For example, the radio base station may suspend the PDSCH in multiple subframes including CSI subframes.

Second Embodiment

According to a second embodiment of the present invention, the start or stop of periodic CSI measurements in each narrow band is reported to a user terminal by using dynamic control signals. The user terminal makes periodic CSI measurements with respect to narrow bands where the user terminal is commanded to start the periodic CSI measurements, and stop the periodic CSI measurements in narrow bands in which the user terminal is commanded to stop the periodic CSI measurements.

Information about the start or stop of periodic CSI measurements in narrow bands is reported from the radio base station to the user terminal in control signals (for example, DCI). For example, this information may be provided by way of re-interpreting a field that is conventionally provided in DCI, or may be provided as a newly configured field. The information to command the start/stop of periodic CSI measurements may include, for example, one-bit information, where '1' commands to start a measurement and '0' commands to stop a measurement.

Also, the information about the start or stop of periodic CSI measurements in narrow bands may include information about the frequencies that are subject to the periodic CSI measurements, information about the timings of CSI subframes (for example, the cycle of CSI subframes, subframe offsets, subframe numbers, subframe locations, and so on), information about the time duration of the periodic CSI measurements, and so on.

Note that the information about the start or stop of periodic narrow band CSI measurements may be reported via higher layer signaling (for example, RRC signaling, MAC signaling, broadcast signals, etc.). Also, the information about the start or stop of periodic narrow band CSI measurements may be provided as values that are associated with information that is reported separately by higher layer signaling and so on. Also, information about the start or stop of periodic CSI measurements in a plurality in narrow bands may be included and reported in one signaling.

The user terminal may acquire information about the periodic CSI measurements in narrow bands by using the information about narrow band CSI subframe sets, which has been described earlier with the first embodiment. In this case, the information about the start or stop of periodic CSI measurements in narrow bands may be used to control the start/stop of measurements based on narrow band CSI subframe sets. By this means, it is possible to control the measurements according to the first embodiment in a dynamic manner, so that it is possible to solve the above-noted problem that arises when there is transmit and/or receive in one narrow band at a timing that meets a CSI subframe in another narrow band. For example, periodic CSI measurements can be controlled so that a subframe in which data is transmitted and/or received in one narrow band and a CSI subframe are not the same subframe.

The user terminal may be structured so that, when the information related to the start of periodic CSI measurements in narrow bands that is received includes information about the time duration of the periodic CSI measurements, the user terminal makes periodic CSI measurement for this duration of time, and, after this time duration is over, stops the periodic CSI measurements.

As described above, the second embodiment can remove unnecessary CSI measurements in user terminals by using control signals for controlling the execution of periodic CSI measurements, transmitted in a PDCCH/EPDCCH, and reduce the increase of power consumption.

Note that, according to the second embodiment, a user terminal should preferably report measured CSI, based on a UL grant, by using a PUSCH in an uplink narrow band. By this means, compared to when the user terminal reports CSI periodically by using a PUCCH, it is possible to avoid making uplink communication less efficient and reduce the increase of power consumption in the user terminal.

Third Embodiment

According to a third embodiment of the present invention, CSI measurement requests for each narrow band are reported to user terminals by using dynamic control signals. Conventionally, in aperiodic CSI measurements, a user terminal reports CSI that has been measured in the past, when triggered by a CSI request contained in a UL grant and/or the like. By contrast with this, according to the third embodiment, a user terminal measures CSI in a predetermined narrow band upon receiving a control signal that includes a CSI measurement request, and reports the measured CSI.

A narrow band CSI measurement request is reported from a radio base station to a user terminal in a control signal (for example, DCI). For example, this information may be reported by providing a field for a CSI measurement request (CSI measurement request field) in DCI. For example, this CSI measurement request field may be provided by way of re-interpreting a field that is conventionally provided in DCI, or may be provided as a newly configured field.

A CSI measurement request may be, for example, a command to trigger CSI measurement and reporting in a predetermined narrow band. In this case, the CSI measurement request can be reported by using a UL grant. Note that this CSI measurement request may be referred to as a "CSI measurement report request."

Also, a CSI measurement request may be, for example, a command that only triggers CSI measurement in a predetermined narrow band. In this case, the CSI measurement request can be reported by using a DL assignment (DL grant).

FIG. 4 provide diagrams to show examples of information related to CSI measurement requests according to the third embodiment. FIG. 4A shows examples of CSI measurement request fields included in UL grants, and FIG. 4B shows examples of CSI measurement request fields included in DL assignments.

FIG. 4A and FIG. 4B are different in that, while FIG. 4A shows information to command CSI measurement and reporting, FIG. 4B shows information that commands CSI measurement alone. Also, in FIG. 4, when the CSI measurement request field shows "00," this means that CSI measurement (and reporting) is not triggered, and, when the CSI measurement request field shows one of "01" to "11," this means that CSI measurement (and reporting) is triggered for one narrow band set among the narrow band sets (the first, second and third narrow band sets) configured higher layers.

Figures 5A, 5B:
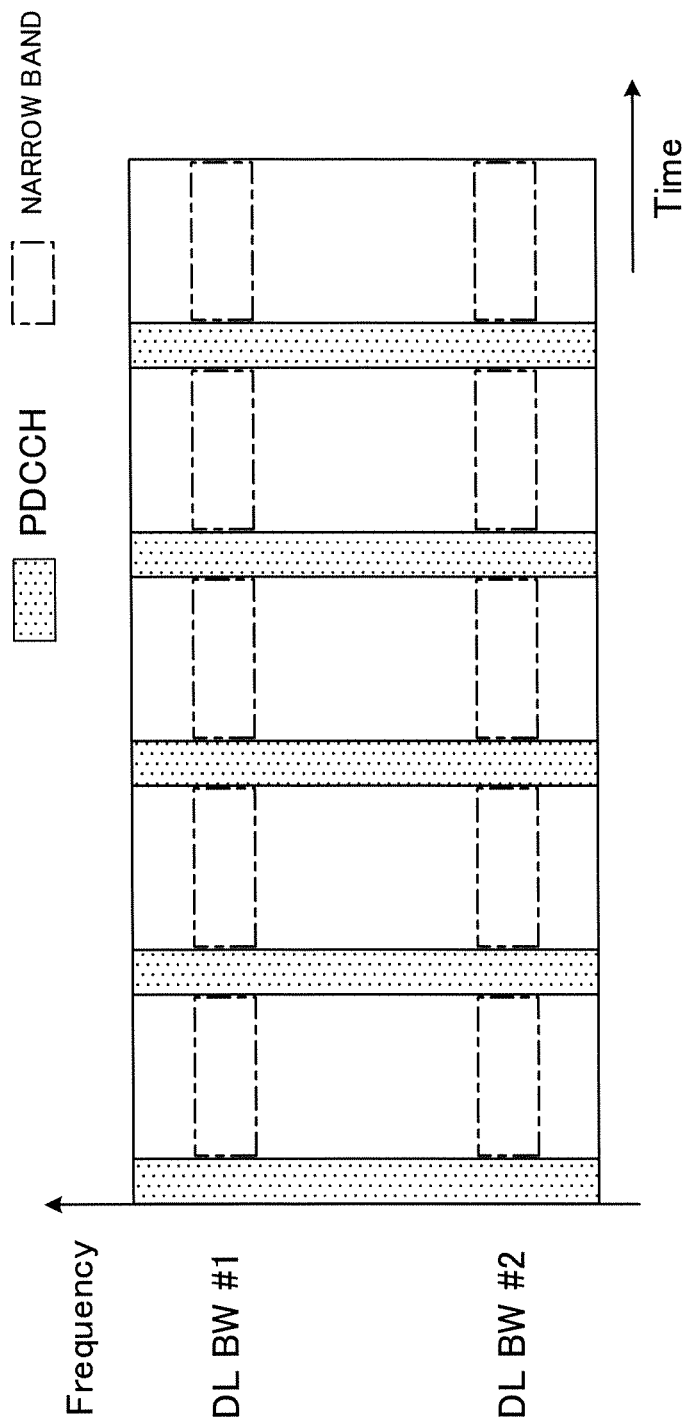
FIG. 5 provide diagrams to show examples of narrow band sets according to an embodiment of the present invention.

FIG. 5 provide diagrams to show examples of narrow band sets according to an embodiment of the present invention. FIG. 5A shows examples of candidate narrow bands included in sets. FIG. 5A shows two downlink band (DL BW #1 and DL BW #2), which are narrow bands configured in a user terminal. FIG. 5B shows examples of linkages between narrow band sets (reduced UE BW sets) and narrow bands, configured by higher layers. In FIG. 5B, the first narrow band set corresponds to DL BW #1, the second narrow band set corresponds to DL BW #2, and the third narrow band set corresponds to DL BW #1 and DL BW #2. In this way, a plurality of narrow bands may be linked with one narrow band set.

Note that, although FIG. 4 shows an example case in which the CSI measurement request field is represented with two bits, this is by no means limiting, The CSI measurement request field may be presented using one bit, or using three or more bits. Also, although FIG. 5 assume that the contents of narrow band sets are configured by higher layer signaling (for example, RRC signaling), this is by no means limiting. For example, a structure may be employed here in which linkages are configured in advance between narrow band sets and the narrow bands which these narrow band sets represent. Also, the number of candidate narrow bands is by no means limited to 2.

With the third embodiment, a user terminal measures and reports CSI, by using UL grants or DL assignments that include the above-described CSI measurement requests, based the following methods (1) to (3), in which:

(1) CSI is measured following a CSI measurement request reported in a UL grant, and the measured CSI is reported by using the uplink resources indicated by the UL grant;

(2) following a CSI measurement request reported in a UL grant, CSI that has been measured in the past is reported by using the uplink resources indicated by the UL grant, and, furthermore, after the report is sent, CSI is measured following the above CSI measurement request; and (3) CSI is measured following a CSI measurement request reported in a DL assignment, and the measured CSI is reported following another UL grant (for example, one including a CSI request) that is reported.

According to method (1), it is possible to tolerate the delay of CSI reporting, remove unnecessary CSI measurements in the user terminal, and reduce the increase of power consumption. Also, according to method (2), it is possible to send a CSI report that includes the latest measurement results, without producing measurement-induced delays, and remove unnecessary CSI measurements. Furthermore, according to above method (3), CSI measurements alone are carried out, so that it is possible to reduce the decrease of the efficiency of uplink communication even more, and, furthermore, remove unnecessary CSI measurements.

Figure 6:
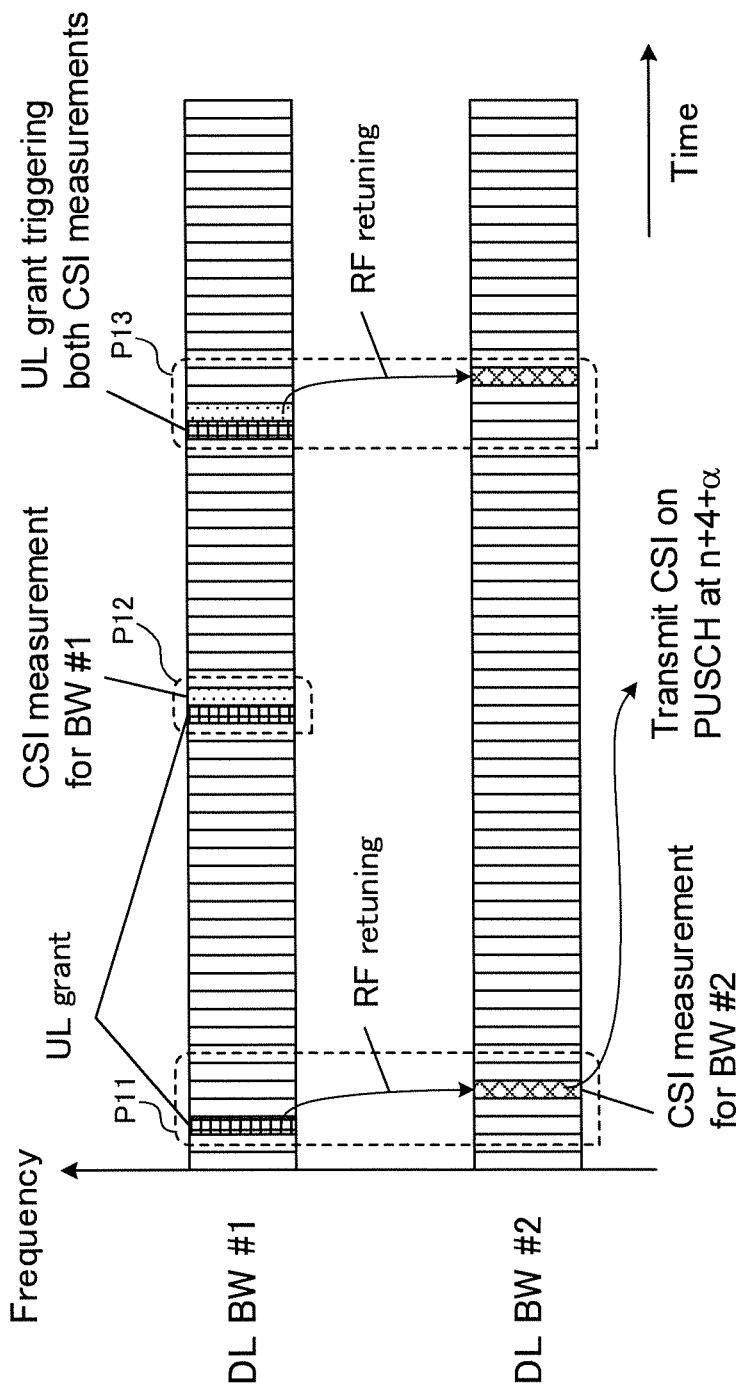
FIG. 6 is a diagram to show an example of operation based on CSI measurement requests according to the third embodiment.

First, method (1) will be described by using specific examples. FIG. 6 is a diagram to show an example of operation based on CSI measurement requests according to the third embodiment. As in FIG. 3, FIG. 6 shows two narrow bands (DL BW #1 and DL BW #2), where a CSI measurement request is reported in a UL grant in DL BW #1. CSI measurement requests to represent varying contents will be described below with reference to periods P11, P12 and P13 in FIG. 6.

In P11, the user terminal receives a UL grant to include a CSI measurement request for DL BW #2, so that the user terminal retunes the frequency (RF retuning) and makes a CSI measurement for BW #2. Based on the above UL grant, the measured CSI is reported in subframe number n+k+α in an uplink narrow band, by using a PUSCH. Note that, although CSI is reported in an unillustrated uplink narrow band in FIG. 6 and FIG. 7 (described later), a frequency to correspond to one of the illustrated downlink narrow bands may be used as an uplink narrow band.

Here, n is the number of the subframe in which the UL grant was detected, and k is a predetermined value (for example, 4), and is a value based on a CSI measurement request-related process. For example, α can be calculated based on the time the time it takes to perform RF retuning, the time it takes to make a CSI measurement (for example, 4 ms), the time it takes to generate a UL signal (for example, 4 ms) and so on. Note that information about this α may be included and reported in DCI, or may be reported via higher layer signaling (RRC signaling, MAC signaling, broadcast signals, etc.). Also, α may be stipulated in advance.

In P12, the user terminal receives UL grant to include a CSI measurement request for DL BW #1, and makes a CSI measurement for BW #1. The receipt of the UL grant and the CSI measurement take place in the same band, so that frequency retuning is not necessary. The measured CSI is ported in the same way as in the example described above with respect to P11 (not shown).

In P13, the user terminal receives a UL grant to include a CSI measurement request for DL BW #1 and DL BW #2, so that the user terminal makes a CSI measurement for BW #1, and, by retuning the frequency, makes a CSI measurement for BW #2 (not shown). All the measured CSI may be reported together in one subframe, or may be reported in separate subframes.

Figure 7:
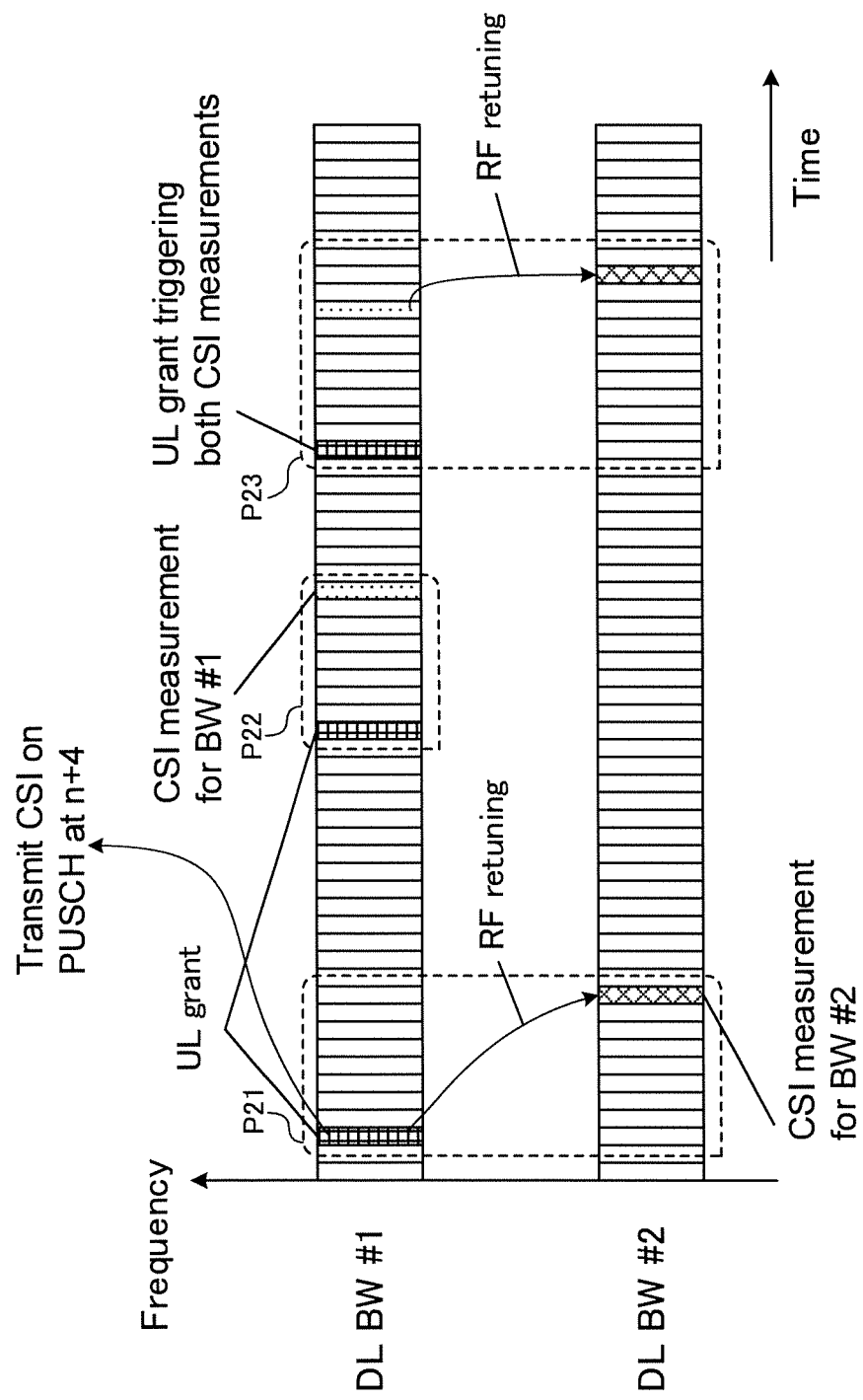
FIG. 7 is a diagram to show another example of operation based on CSI measurement requests according to the third embodiment.

Next, method (2) will be described by using specific examples. FIG. 6 is a diagram to show another example of operation based on CSI measurement requests according to the third embodiment. FIG. 7 shows examples of processes, which, upon receiving the same UL grants as in FIG. 6, the user terminal performs based on method (2), not method (1).

In P21, the user terminal receives a UL grant to include a CSI measurement request for DL BW #2, so that the user terminal judges whether or not there is CSI that has been measured in the past with respect to DL BW #2. At this point in time, the user terminal does not have CSI of DL BW #2, and therefore the user terminal sends a CSI report, in which "0" (corresponding to OOR (Out Of Range)) is included as a CQI (Channel Quality Indicator) index).

Based on the above UL grant, the CSI report is sent in subframe number n+k in an uplink narrow band, by using a PUSCH. Here, n is the number of the subframe in which the UL grant was detected, and k is a predetermined value (for example, 4). After reporting the CSI, the user terminal retunes the frequency, measures the CSI of BW #2 and keeps the measurement result.

In P22, the user terminal receives a UL grant to include a CSI measurement request for DL BW #1, and judges whether or not there is measured CSI for DL BW #1. At this point in time, the user terminal does not have the CSI of DL BW #1, and therefore sends a CSI report, in which "0" is included as a CQI index (not shown). The CSI is ported in the same way as in the example described above with respect to P21. After reporting the CSI, the user terminal measures the CSI of BW #1 and keeps the measurement result.

In P23, the user terminal receives a UL grant to include a CSI measurement request for DL BW #1 and DL BW #2, and judges whether or not there is measured CSI for these multiple narrow bands. At this point in time, the user terminal already has CSIs for both narrow band, and therefore reports these CSIs based on the above UL grant (not shown). After reporting the CSI, the user terminal measures the CSI of BW #1 and BW #2, and keeps (updates) the measurement results.

Note that, when a user terminal receives a CSI measurement request for a plurality of narrow bands and yet has no CSI measurement results for part or all of the narrow bands, the user terminal can send a CSI report by including "0" as a CQI index for part or all of the narrow bands.

Next, method (3) will be described. When the user terminal receives a DL assignment to include a CSI measurement request for a predetermined narrow band, if necessary, the user terminal retunes the frequency and makes a CSI measurement for the above predetermined narrow band, and keeps (or updates) the measurement result. If the user terminal later receives a UL grant to include a CSI request for this predetermined narrow band, the user terminal reports the CSI that is kept, based on the UL grant.

Note that, when the user terminal, before making a CSI measurement for a predetermined narrow band, receives a UL grant including a CSI request for this predetermined narrow band, the user terminal can report CSI by including "0" as a CQI index. Also, the DCI to command measurements and the DCI to command reporting may assume different formats.

As described above, according to the third embodiment, it is possible to reduce the number of times to make CSI measurements in narrow band, by applying control that is based on CSI measurement requests, and, furthermore, control CSI measurements and/or CSI reporting flexibly.

Note that, in each of the above-described embodiments, UL grants to include CSI requests for predetermined narrow bands may be used for narrow band CSI measurements and reporting. FIG. 8 is a diagram to show examples of information related to CSI measurement requests according to the third embodiment. In FIG. 8, when the CSI request field included in a UL grant shows "00," this means that CSI reporting is not triggered, and, when the CSI request field shows one of "01" to "11," this means that CSI reporting is triggered for one narrow band set among the narrow band sets (the first, second and third narrow band sets) configured higher layers. For example, this CSI request field may be provided by way of re-interpreting a field that is conventionally provided in DCI, or may be provided as a newly configured field.

Also, which one of a CSI measurement request field related to a predetermined narrow band, a CSI request field related to a predetermined narrow band and an existing CSI request field a predetermined field included in a predetermined DCI format represents may be reported to the user terminal in higher layer signaling (for example, RRC signaling, MAC signaling, a broadcast signal, etc.). For example, the user terminal may be structured to identify a predetermined field as a CSI measurement request field based on RRC signaling.

<Radio Communication System>

Now, the structure of the radio communication system according to an embodiment of the present invention will be described below. In this radio communication system, the radio communication methods according to the above-described embodiments of the present invention are employed. Note that the radio communication methods of the above-described embodiments may be applied individually or may be applied in combination. Here, although MTC terminals will be shown as examples of user terminals in which the band to use is limited to narrow bands, the present invention is by no means limited to MTC terminals.

Figure 9:
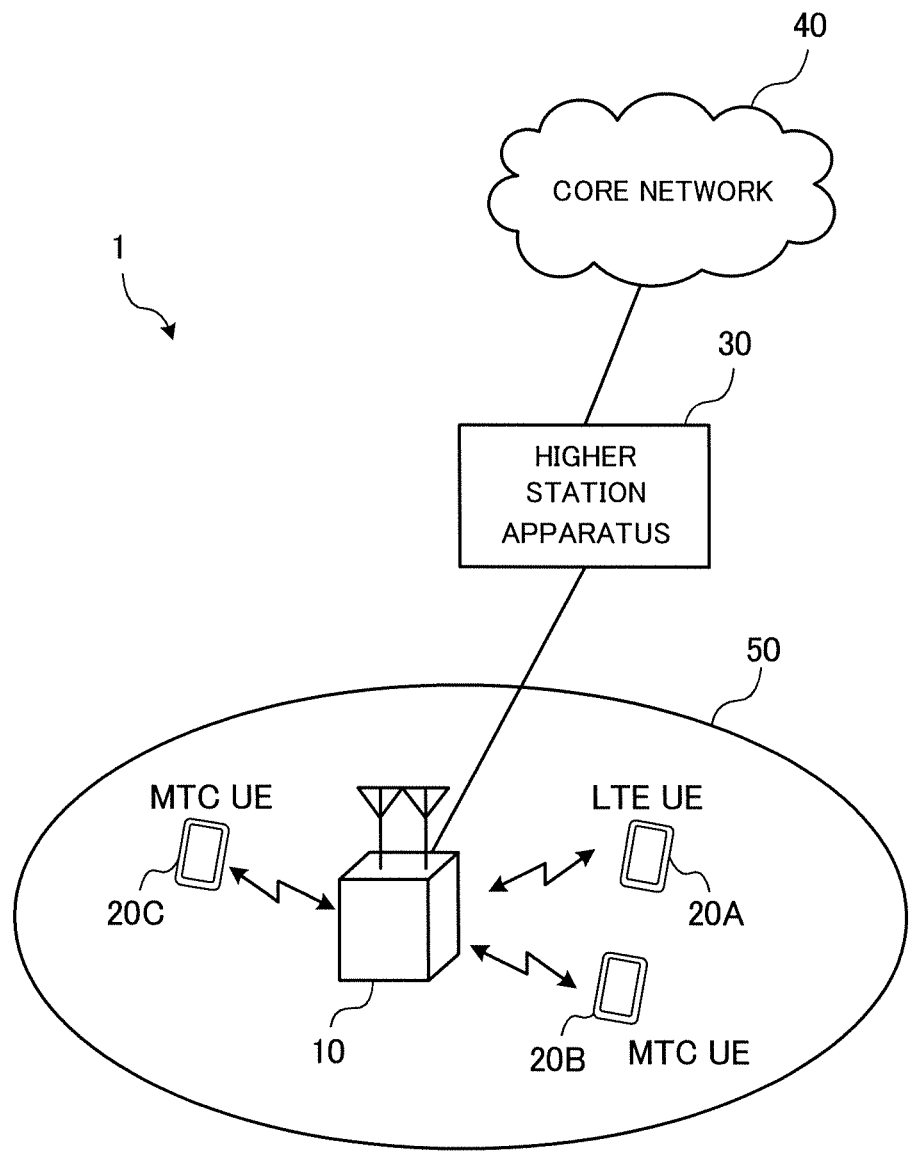
FIG. 9 is a diagram to show a schematic structure of a radio communication system according to an embodiment of the present invention.

FIG. 9 is a diagram to show a schematic structure of the radio communication system according to an embodiment of the present invention. The radio communication system 1 shown in FIG. 9 is an example of employing an LTE system in the network domain of a machine communication system. The radio communication system 1 can adopt carrier aggregation (CA) and/or dual connectivity (DC) to group a plurality of fundamental frequency blocks (component carriers) into one, where the LTE system bandwidth constitutes one unit. Also, although, in this LTE system, the system band is configured to maximum 20 MHz in both the downlink and the uplink, this configuration is by no means limiting. Note that the radio communication system 1 may be referred to as "SUPER 3G," "LTE-A" (LTE-Advanced), "IMT-Advanced," "4G," "5G," "FRA" (Future Radio Access) and so on.

The radio communication system 1 is comprised of a radio base station 10 and a plurality of user terminals 20A, 20B and 20C that are connected with the radio base station 10. The radio base station 10 is connected with a higher station apparatus 30, and connected with a core network 40 via the higher station apparatus 30. Note that the higher station apparatus 30 may be, for example, an access gateway apparatus, a radio network controller (RNC), a mobility management entity (MME) and so on, but is by no means limited to these.

A plurality of user terminal 20A, 20B and 20C can communicate with the radio base station 10 in a cell 50. For example, the user terminal 20A is a user terminal that supports LTE (up to Rel-10) or LTE-Advanced (including Rel-10 and later versions) (hereinafter referred to as an "LTE terminal"), and the other user terminals 20B and 20C are MTC terminals that serve as communication devices in machine communication systems. Hereinafter the user terminals 20A, 20B and 20C will be simply referred to as "user terminals 20," unless specified otherwise.

Note that the MTC terminals 20B and 20C are terminals that support various communication schemes including LTE and LTE-A, and are by no means limited to stationary communication terminals such electric meters, gas meters, vending machines and so on, and can be mobile communication terminals such as vehicles. Furthermore, the user terminals 20 may communicate with other user terminals directly, or communicate with other user terminals via the radio base station 10.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, MIBs (Master Information Blocks) are communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data and higher layer control information are communicated by the PUSCH. Also, downlink radio quality information (CQI: Channel Quality Indicator), delivery acknowledgement signals and so on are communicated by the PUCCH. By means of the PRACH, random access preambles (RA preambles) for establishing connections with cells are communicated.

Figure 10:
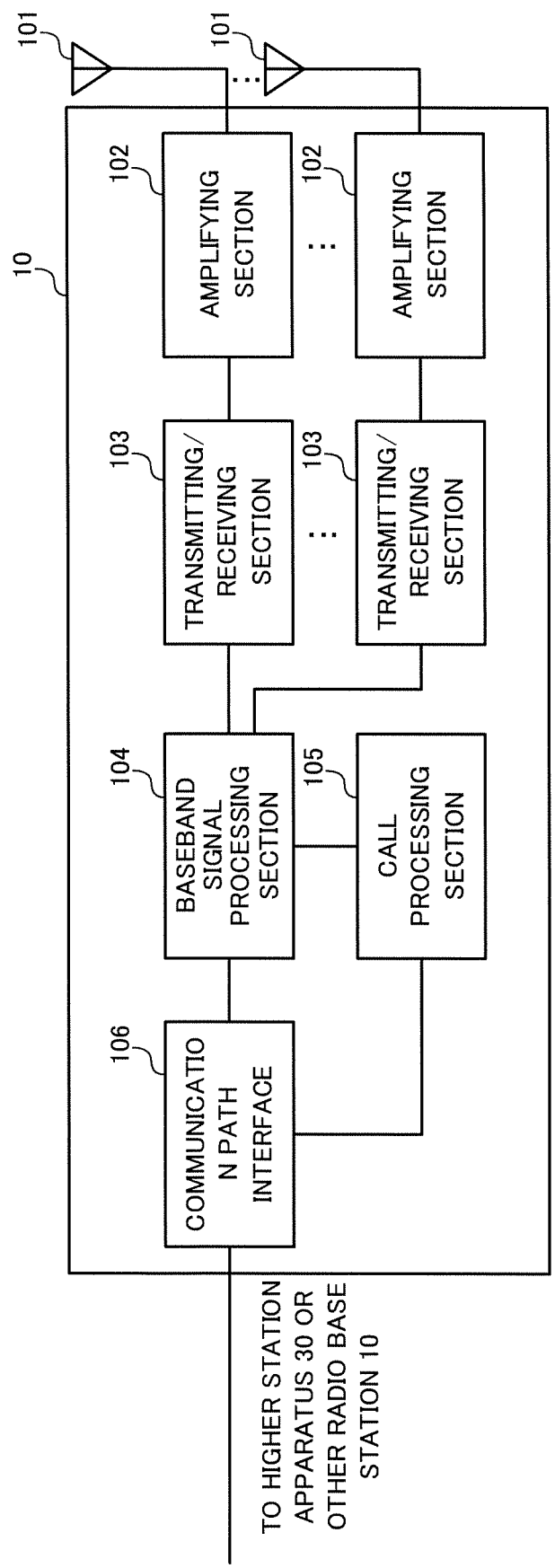
FIG. 10 is a diagram to show an example of an overall structure of a radio base station according to an embodiment of the present invention.

FIG. 10 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that the transmitting/receiving sections 103 are comprised of transmitting sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts baseband signals that are pre-coded and output from the baseband signal processing section 104 on a per antenna basis, into a radio frequency band. The radio frequency signals having been subjected to frequency conversion in the transmitting/receiving sections 103 are amplified in the amplifying sections 102, and transmitted from the transmitting/receiving antennas 101. The transmitting/receiving sections 103 can transmit and/or receive various signals in a narrow bandwidth (for example, 1.4 MHz) that is more limited than a system band (for example, one component carrier). For the transmitting/receiving sections 103, transmitters/receivers, transmitting/receiving circuits or transmitting/receiving devices that can be described based on common understanding of the technical field to which the present invention pertains can be used.

Meanwhile, as for uplink signals, radio frequency signals that are received in the transmitting/receiving antennas 101 are each amplified in the amplifying sections 102. Each transmitting/receiving section 103 receives uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC re transmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The transmitting/receiving sections 103, for example, transmit information related to narrow band CSI measurements to the user terminals 20. Also, the transmitting/receiving sections 103 receives the CSIs of a plurality of narrow bands, measured separately based on the CSI measurement-related information.

The communication path interface section 106 transmits and receives signals to and from the higher station apparatus 30 via a predetermined interface. Also, the communication path interface 106 may transmit and/or receive signals (backhaul signaling) with other radio base stations 10 via an inter-base station interface (for example, an interface in compliance with the CPRI (Common Public Radio Interface), such as optical fiber, the X2 interface, etc.).

Figure 11:
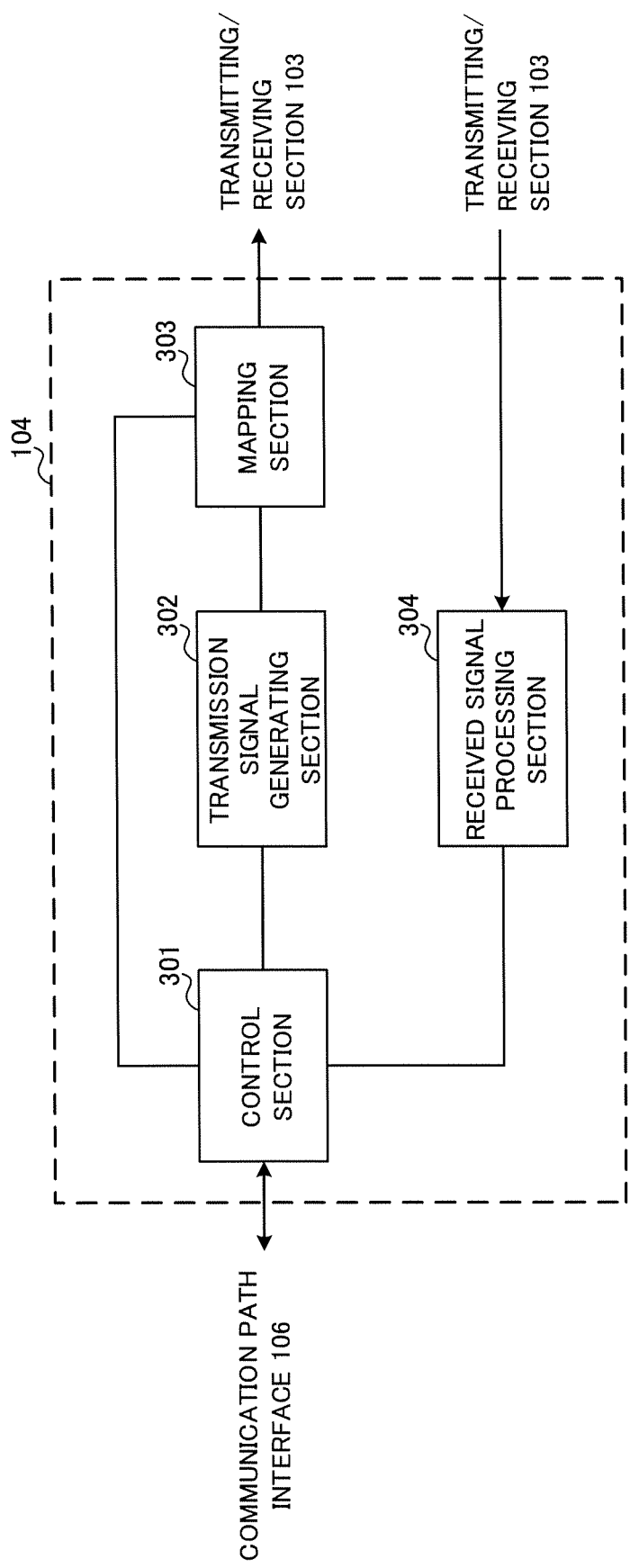
FIG. 11 is a diagram to show an example of a functional structure of a radio base station according to one embodiment of the present invention.

FIG. 11 is a diagram to show an example of a functional structure of a radio base station according to the present embodiment. Note that, although FIG. 11 primarily shows functional blocks that pertain to characteristic parts of the present embodiment, the radio base station 10 has other functional blocks that are necessary for radio communication as well. As shown in FIG. 11, the baseband signal processing section 104 has a control section (scheduler) 301, a transmission signal generating section (generating section) 302, a mapping section 303 and a received signal processing section 304.

The control section (scheduler) 301 controls the scheduling of (for example, allocates resources to) downlink data signals that are transmitted in the PDSCH and downlink control signals that are communicated in the PDCCH and/or the EPDCCH. Also, the control section 301 controls the scheduling of synchronization signals, and downlink reference signals such as CRSs (Cell-specific Reference Signals), CSI-RSs (Channel State Information Reference Signals), DM-RSs (Demodulation Reference Signals) and so on. Also, the control section 301 also controls the scheduling of uplink data signals that are transmitted in the PUSCH, uplink control signals that are transmitted in the PUCCH and/or the PUSCH, random access preambles that are transmitted in the PRACH, and so on.

The control section 301 controls the transmission signal generating section 302 and the mapping section 303 to allocate various signals to narrow bands and transmit these to the user terminals 20. For example, the control section 301 control downlink system information (MIBs, SIBs, etc.), EPDCCHs, PDSCHs and so on, to be transmitted in narrow bands.

Also, the control section 301 may control information about narrow band CSI subframe sets (first embodiment), information about the start or stop of periodic CSI measurements in narrow bands (second embodiment), narrow band CSI measurement requests (third embodiment) and so on, to be transmitted to the user terminals 20, as information related to narrow band CSI measurements. For the control section 301, a controller, a control circuit or a control device that can be described based on common understanding of the technical field to which the present invention pertains can be used.

The control section 301 may exert control, so that, at a timing a connecting user terminal 20 measures CSI in a predetermined narrow band, PDSCH transmission is not carried out in other narrow bands or PDSCH transmission is suspended in other narrow bands.

The transmission signal generating section 302 generates DL signals based on commands from the control section 301 and outputs these signals to the mapping section 303. For example, the transmission signal generating section 302 generates DL assignments, which report downlink signal allocation information, and UL grants, which report uplink signal allocation information, based on commands from the control section 301. For example, narrow band CSI measurement requests may be included in DL assignments and/or UL grants.

Also, the downlink data signals are subjected to a coding process and a modulation process, based on coding rates and modulation schemes that are determined based on channel state information (CSI) from each user terminal 20 and so on. For the transmission signal generating section 302, a signal generator, a signal generating circuit or a signal generating device that can be described based on common understanding of the technical field to which the present invention pertains can be used.

The mapping section 303 maps the downlink signals generated in the transmission signal generating section 302 to predetermined narrow band radio resources (for example, maximum 6 resource blocks) based on commands from the control section 301, and outputs these to the transmitting/receiving sections 103. For the mapping section 303, mapper, a mapping circuit or a mapping device that can be described based on common understanding of the technical field to which the present invention pertains can be used.

The received signal processing section 304 performs receiving processes (for example, demapping, demodulation, decoding and so on) of received signals that are input from the transmitting/receiving sections 103. Here, the received signals are, for example, UL signals that are transmitted from the user terminals 20 (such as delivery acknowledgement signals (HARQ-ACKs), data signals that are transmitted in the PUSCH, and so on). The received signal processing section 304 outputs the received information to the control section 301.

Also, by using the received signals, the received signal processing section 304 may measure the received power (for example, RSRP (Reference Signal Received Power)), the received quality (for example, RSRQ (Reference Signal Received Quality)), channel states and so on. The measurement results may be output to the control section 301. The receiving process section 304 can be constituted by a signal processor, a signal processing circuit or a signal processing device, and a measurer, a measurement circuit or a measurement device that can be described based on common understanding of the technical field to which the present invention pertains.

Figure 12:
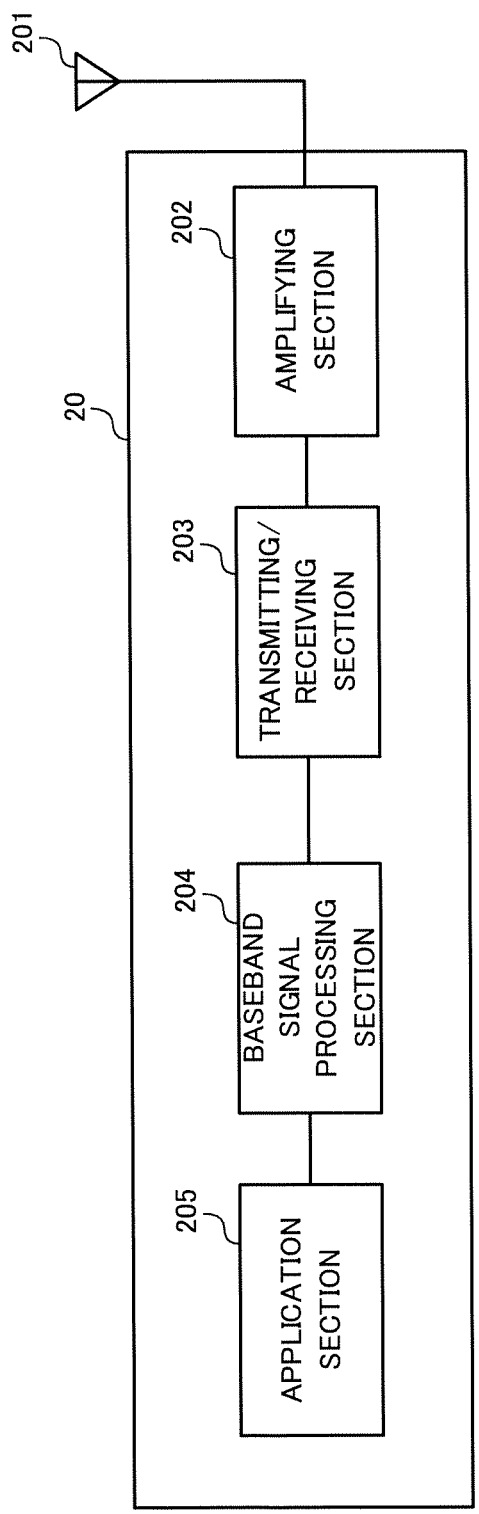
FIG. 12 is a diagram to show an example of an overall structure of a user terminal according to an embodiment of the present invention.

FIG. 12 is a diagram to show an example of an overall structure of a user terminal according to the present embodiment. Note that, although not described in detail herein, normal LTE terminals may operate to act as MTC terminals. A user terminal 20 has a plurality of transmitting/receiving antennas 201, amplifying sections 202, transmitting/receiving sections 203, a baseband signal processing section 204 and an application section 205. Note that the transmitting/receiving sections 203 are comprised of transmitting sections and receiving sections. Also, the user terminal 20 may have a plurality of transmitting/receiving antennas 201, amplifying sections 202, transmitting/receiving sections 203 and/or others.

Radio frequency signals that are received in a plurality of transmitting/receiving antennas 201 are each amplified in the amplifying sections 202. Each transmitting/receiving section 203 receives the downlink signals amplified in the amplifying sections 202. The received signals are subjected to frequency conversion and converted into the baseband signal in the transmitting/receiving sections 203, and output to the baseband signal processing section 204. For the transmitting/receiving sections 203, transmitters/receivers, transmitting/receiving circuits or transmitting/receiving devices that can be described based on common understanding of the technical field to which the present invention pertains can be used.

The transmitting/receiving sections 203 transmit the CSIs of plurality of narrow bands, measured separately in the measurement section 405 (described later) based on the information related to narrow band CSI measurements, to the radio base station 10. Also, the transmitting/receiving sections 203 receive the information related to narrow band CSI measurements.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Figure 13:
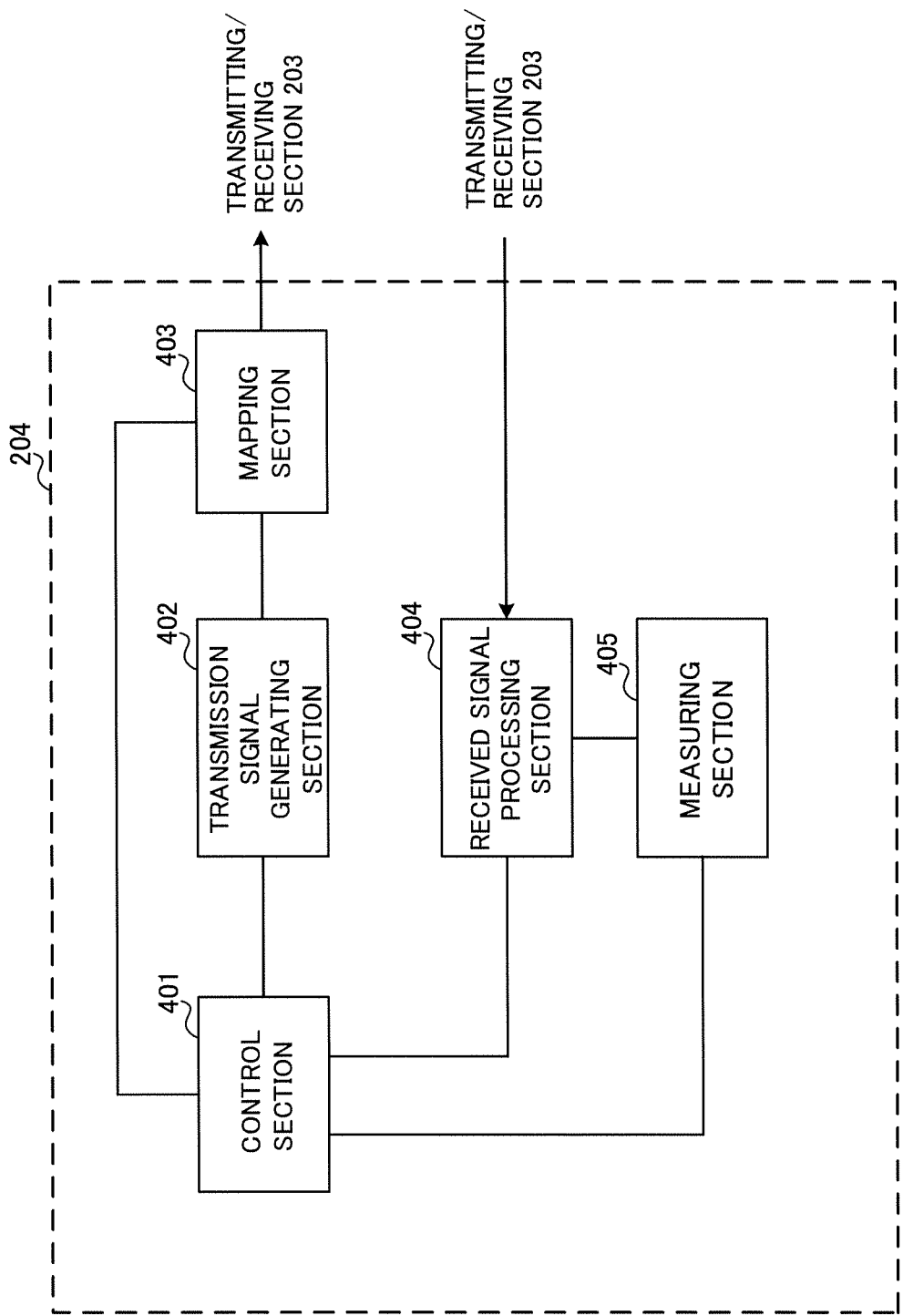
FIG. 13 is a diagram to show an example of a functional structure of a user terminal according to an embodiment of the present invention.

FIG. 13 is a diagram to show an example of a functional structure of a user terminal according to the present embodiment. Note that, although FIG. 13 primarily shows functional blocks that pertain to characteristic parts of the present embodiment, the user terminal 20 has other functional blocks that are necessary for radio communication as well. As shown in FIG. 13, the baseband signal processing section 204 provided in the user terminal 20 has a control section 401, a transmission signal generating section 402, a mapping section 403, a received signal processing section 404 and a measurement section 405.

The control section 401 controls the transmission signal generating section 402 and the mapping section 403. The control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals (HARQ-ACKs) and so on) and uplink data signals based on the downlink control signals, the results of deciding whether or not retransmission control is necessary for the downlink data signals, and so on. For the control section 401, a controller, a control circuit or a control device that can be described based on common understanding of the technical field to which the present invention pertains can be used. Note that, the control section 401, combined with the measurement section 405, may constitute the measurement section of the present invention.

The control section 401 controls the execution of CSI measurements in the measurement section 405, and the generation and transmission of CSI reports in the transmission signal generating section 402 and the mapping section 403, based on the information related to narrow band CSI measurements, input from the received signal processing section 404.

For example, based on the information about narrow band CSI subframe sets, the control section 401 controls the measurement section 405 to measure the CSI of a predetermined narrow band in a subframe belonging to a predetermined CSI subframe set (first embodiment).

Also, based on the information about the start or stop of periodic CSI measurements in narrow bands, the control section 401 controls the measurement section 405 to make (start, stop, and so on) periodic CSI measurements with respect to predetermined narrow bands (second embodiment).

Also, after information related to a narrow band CSI measurement request is detected in the received signal processing section 404, the control section 401 controls the measurement section 405 to measures the CSI of a predetermined narrow band once at a predetermined timing (third embodiment).

Based on a UL grant that includes a CSI measurement request or a CSI request for a predetermined narrow band, the control section 401 exerts control so that CSI that is measured in this predetermined narrow band (for example, the latest measured CSI) is reported based on the above UL grant. Note that, when the user terminal 20 has no measured CSI, the control section 401 may exert control so that a CSI report to include "0" as a CQI index is sent.

Also, the control section 401 can identify the reporting-target narrow band addressed by a CSI measurement request or a CSI request based on narrow band sets configured by higher layer signaling. Also, the control section 401 may exert control so that CSI measured in a predetermined narrow band is reported based on an existing CSI request.

The transmission signal generating section 402 generates UL signals based on commands from the control section 401, and outputs these signals to the mapping section 403. For example, the transmission signal generating section 402 generates uplink control signals such as delivery acknowledgement signals (HARQ-ACKs), channel state information (CSI) and so on, based on commands from the control section 401. Also, the transmission signal generating section 402 generates uplink data signals based on commands from the control section 401. For example, when a UL grant is included in a downlink control signal that is reported from the radio base station 10, the control section 401 commands the transmission signal generating section 402 to generate an uplink data signal. For the transmission signal generating section 402, a signal generator, a signal generating circuit or a signal generating device that can be described based on common understanding of the technical field to which the present invention pertains can be used.

The mapping section 403 maps the uplink signals generated in the transmission signal generating section 402 to radio resources (maximum 6 resource blocks) based on commands from the control section 401, and outputs these to the transmitting/receiving sections 203. For the mapping section 403, mapper, a mapping circuit or a mapping device that can be described based on common understanding of the technical field to which the present invention pertains can be used.

The received signal processing section 404 performs receiving processes (for example, demapping, demodulation, decoding and so on) of received signals that are input from the transmitting/receiving sections 203. Here, the received signals are, for example, DL signals transmitted from the radio base station 10 (such as downlink control signals, downlink data signals transmitted in the PDSCH, and so on).

The received signal processing section 404 outputs the received information to the control section 401. The received signal processing section 404 outputs, for example, broadcast information, system information, RRC signaling, DCI and so on, to the control section 401. Also, the received signal processing section 404 outputs the received signals, the signals after the receiving processes and so on to the measurement section 405. For the received signal processing section 404, a signal processor, a signal processing circuit or a signal processing device that can be described based on common understanding of the technical field to which the present invention pertains can be used. Also, the received signal processing section 404 can constitute the receiving section according to the present invention.

The measurement section 405 may measure the CSIs of a plurality of narrow bands. separately, based on commands from the control section 401. Also, the measurement section 405 may measure the received power (RSRP), the receive quality (RSRQ), and so on, by using received signals. Note that the processing results and the measurement results may be output to the control section 401. For the received signal processing section 404, a signal processor/measurer, a signal processing/measurement circuit or a signal processing/measurement device that can be described based on common understanding of the technical field to which the present invention pertains can be used.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or wire and using these multiple devices.

For example, part or all of the functions of radio base stations 10 and user terminals 20 may be implemented using hardware such as ASICs (Application-Specific Integrated Circuits), PLDs (Programmable Logic Devices), FPGAs (Field Programmable Gate Arrays), and so on. Also, the radio base stations 10 and user terminals 20 may be implemented with a computer device that includes a processor (CPU), a communication interface for connecting with networks, a memory and a computer-readable storage medium that holds programs. That is, the radio base stations and user terminals according to an embodiment of the present invention may function as computers that execute the processes of the radio communication method of the present invention.

Here, the processor and the memory are connected with a bus for communicating information. Also, the computer-readable recording medium is a storage medium such as, for example, a flexible disk, an opto-magnetic disk, a ROM (Read Only Memory), an EPROM (Erasable Programmable ROM), a CD-ROM (Compact Disc-ROM), a RAM (Random Access Memory), a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes.

Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The disclosure of Japanese Patent Application No. 2015-011047, filed on Jan. 23, 2015, including the specification, drawings and abstract, is incorporated herein by reference in its entirety.

The invention claimed is:

1. A terminal comprising:
a receiver that receives, via higher layer signaling, an information related to a band, and receives a downlink control information containing an information related to starting or stopping a channel state information (CSI) measurement of the band; and
a processor that, after the information related to starting or stopping the CSI measurement is received, receives a reference signal in the band, performs a CSI measurement in the band using the reference signal, and controls a transmission of a result of the measurement.

2. The terminal according to claim 1, wherein the band is one of a plurality of different bands in a downlink.

3. The terminal according to claim 1, wherein the information related to the band includes a periodicity of the reference signal.

4. The terminal according to claim 1, wherein the CSI measurement is a periodic CSI measurement.

5. The terminal according to claim 1, wherein the processor performs a control to transmit the result of the measurement in a resource, indicated by the downlink control information.

6. A base station comprising:
a transmitter that transmits to a terminal, via higher layer signaling, an information related to a band, transmits to the terminal a downlink control information containing an information related to starting or stopping a channel state information (CSI) measurement of the band, and after the information related to starting or stopping the CSI measurement is transmitted, the transmitter transmits a reference signal in the band; and
a receiver that receives a result of the CSI measurement in the band that is performed using the reference signal after the terminal has received the information related to starting or stopping the CSI measurement.

7. A radio communication method for a terminal comprising:
receiving, via higher layer signaling, an information related to a band;
receiving a downlink control information containing an information related to starting or stopping a channel state information (CSI) measurement of the band;
receiving a reference signal in the band after the information related to starting or stopping the CSI measurement is received;
performing a CSI measurement in the band using the reference signal after the information related to starting or stopping the CSI measurement is received; and
controlling a transmission of a result of the measurement.

* * * * *